2,748,035
Patented May 29, 1956

UNITED STATES PATENT OFFICE 2,748,035

METHOD OF AND COMPOSITION FOR CLEANING CONTAINERS CONTAINING ALUMINUM AND TIN

Ira J. Duncan, Detroit, Mich., assignor to Detrex Corporation, Detroit, Mich., a corporation of Michigan No Drawing. Application July 21, 1953,
Serial No. 369,532

3 Claims. (Cl. 134—2)

This invention relates to a method of and composition for cleaning containers, and more particularly concerns the removal of carbonized and grease-carbon incrustations from baking pans without corroding the pans. More specifically the invention concerns the application of an alkaline cleaning solution to one or more bread baking pans and the like, the surfaces of which contain unlike metals or metal oxides such as tin or aluminum metal or oxide, or mixtures thereof.

Before new tinned bread pans are placed into service by the baker, they are first heated in an oven at 400°–425° F. for several hours. This burning-out process gives to the tin surface a grayish blue color which improves the baking characteristics of the pan. The burned-out surface is also known as a tin oxide coating. Most pans used in the bread baking industry are made of tin coated steel and have reinforcing bands constructed of galvanized or tinned steel. However, pan manufacturers also use aluminized steel for the bands on some pans. Accordingly the burnt-out pans may have tin or tin oxide surfaces while the bands or straps may have tin, tin oxide, aluminum or aluminum oxide surfaces.

It has heretofore been common practice to clean soiled tin-plated steel bread pans by immersion in a boiling alkaline cleaning solution in a boil tank. It has been necessary to inhibit such cleaners in order to prevent attack on the tin oxide surface of the pan. This has usually been accomplished by the addition of chromate and/or silicate salts to the cleaner, as disclosed in the patents to Adler No. 1,734,706 and Scott No. 1,879,953, for example. But when cleaning pans constructed of both tin and aluminum, or when a mixture of tin and aluminum pans is cleaned in a common solution, the above mentioned inhibited cleaners do not protect the tin surface adequately.

When two metals, e. g. tin and aluminum, are in contact while immersed in the cleaning solution there is a tendency for both tin and aluminum to go into solution. When this takes place the metals become electro-negative. Since the solution potential of tin and aluminum are not of the same magnitude a galvanic action is set up between the two metals. Pans constructed of both tin and aluminum and covered with bakery soil exhibit in some cases a greater galvanic action than similar clean pans.

The function of inhibitors is to passivate the metal surfaces and to prevent the metal from going into solution, and thus to eliminate galvanic cell activity. Chromate and silicate salts alone are not capable of preventing this galvanic activity when tin and aluminum are present either as metals or oxides in a common solution.

It is accordingly an object of this invention to overcome the foregoing difficulties and disadvantages. Another object is to provide a method of and composition for cleaning carbonized and grease-carbon incrustations from baking containers having surfaces containing tin and aluminum, without appreciable tin attack on the surface. Other objects and advantages of this invention will further appear hereinafter.

I have discovered that the incorporation of ferricyanide ions into chromate-silicate inhibited alkaline cleaners prevents attack on the tin when cleaning tin and aluminum surfaces in a common alkaline cleaning solution.

The ferricyanide salt may be incorporated into the cleaner as such, or a mixture of a ferrocyanide salt and oxidizing agent such as a persulfate salt may be used. Other means for introducing ferricyanide ions into the solution are also comprehended. Ferrocyanide ions may be oxidized to ferricyanide ions by the persulfate salt or other oxidizing agent when they are dissolved in water. If desirable, from the standpoint of economy, a mixture of ferrocyanide salt, chromate or dichromate salt and an acid or acid salt, such as sodium bisulfate, may be dissolved in water and then added to the cleaning solution in the boil tank. This mixture also produces ferricyanide ions, and gives good results.

In practice, sodium and potassium ferricyanide are preferably incorporated into the cleaning solution. However, my discovery is not limited to these salts; the ammonium and the other alkali metals salts and their equivalents may be substituted as well as other salts which are compatible with alkali cleaning solutions containing chromates and silicates.

Cleaners containing about 2–12% by weight potassium ferricyanide (based on total solids) or an equivalent weight of other ferricyanide salts or salts producing equivalent amounts of ferricyanide ions have been found to give good protection.

The concentration of ferricyanide solution required to protect the tin surface depends on the type of soil present and the type of "burn-in" on the pans. However, ferricyanide ion concentrations of about 2–7% by weight of solution have been found preferable. Higher concentrations are effective but generally unnecessary.

The alkali cleaner solution in accordance with this invention contains a strongly alkaline material (such as soda ash, for example) in a substantial amount. It also preferably contains a phosphate such as an alkali metal orthophosphate and/or an alkali metal tripolyphosphate.

As inhibitors the solution preferably contains soluble chromate ions and soluble silicate ions, in combination with a substantial proportion, say 2–8% by weight or even more of alkali metal ferricyanide, or of equivalent amounts of other materials which react in the solution to produce an equivalent amount of ferricyanide ions.

It is preferred in the practice of this invention, since optimum results are obtained, to maintain the proportion of the ingredients of the composition within the following range:

| Component | Percent by weight |
|---|---|
| Alkali metal carbonate | 10 to 50. |
| Phosphate ions | 3 to 15. |
| Silicate ions | 4 to 20. |
| Chromate ions | 3 to 8. |
| Ferricyanide ions | 2 to 8. |

In certain instances, particularly with tin pans, the above solutions may be utilized without the incorporation of silicate ions therein. Such solutions contain the following ingredients in the proportions indicated:

| Component | Percent by weight |
|---|---|
| Alkali metal carbonate | 10 to 50. |
| Phosphate ions | 3 to 15. |
| Chromate ions | 3 to 8. |
| Ferricyanide ions | 2 to 8. |

The following examples further illustrate the invention:

Example 1

A chemical mixture was prepared consisting of the following ingredients in the amounts stated:

| | Percent |
|---|---|
| Trisodium phosphate | 15 |
| Sodium tripolyphosphate | 15 |
| G-brand silicate ($Na_2O:SiO_2=1:3$) | 5 |
| Sodium carbonate | 45 |
| Sodium chromate | 10 |
| Potassium ferricyanide | 10 |

This composition was dissolved in water at a concentration of 4 ounces/gallon. Soiled baking pans were cleaned in the solution at boiling temperature. Cleaning was complete after a period of 4 hours. The pans were successfully cleaned without damage to the tin surfaces. The same solution with ferricyanide removed attacked tin within 10 minutes under the same conditions.

Example 2

The following chemicals were dissolved in water:

| | Percent |
|---|---|
| Trisodium phosphate | 17.0 |
| Sodium tripolyphosphate | 17.0 |
| G-brand silicate (1:3) | 5.7 |
| Sodium carbonate | 51.3 |
| Sodium chromate | 9.0 |

To 800 cc. of a 4% solution of the above mixture was added a boiling aqueous solution containing 2 grams potassium ferricyanide and 0.5 gram sodium dichromate dissolved in 20 cc. water. Tinned and aluminized metals with grease-carbon incrustations thereon were immersed in the resulting solution for a period of 5 hours. Good cleaning was obtained without observable brightening of tin or corrosion of aluminum.

Example 3

The following ingredients, in the proportions indicated, utilized as in Example 2, provide excellent cleaning of mixed tinned and aluminized containers without observable tin or aluminum attack.

| | Percent |
|---|---|
| Sodium meta silicate | 15 |
| Trisodium phosphate | 20 |
| Sodium tripolyphosphate | 10 |
| Potassium persulfate | 2 |
| Sodium ferrocyanide | 5 |
| Sodium carbonate | 48 |

Example 4

A formula was prepared as follows:

| | Percent |
|---|---|
| Trisodium phosphate | 20 |
| "G-Brand" silicate ($Na_2O:SiO_2=1:3$) | 5 |
| Sodium tripolyphosphate | 10 |
| Sodium chromate | 10 |
| Sodium carbonate | 55 |

3 grams of sodium ferrocyanide and 0.5 gram of sodium dichromate were dissolved in 800 cc. warm water. To this solution was added 25 grams of the above identified formula. Sections of tin pans with aluminized steel straps were cleaned in the solution without attack. The same solution, without ferrocyanide or dichromate, brightened tin within 10 minutes when utilized under the same conditions.

It will be appreciated that, although certain of the examples indicate a maximum ferricyanide ion proportion of about 8%, this does not represent the maximum operable proportion, since solutions containing substantially more ferricyanide are effective. The 8% figure represents the maximum proportion of ferricyanide ion usually found to be necessary; any substantial excess ferricyanide is usually unnecessary but not harmful.

Having thus described the invention, I claim:

1. In a method of removing incrustations from a baking container having a surface comprising at least two members selected from the group which includes tin, aluminum and their oxides, the steps which comprises immersing said container in an aqueous alkaline cleaning solution containing by weight about 3–8% chromate, about 4–20% silicate and about 2–8% ferricyanide ions, and boiling said solution while the container is immersed therein.

2. In a method of removing incrustations from a baking container having a surface comprising at least two members selected from the group which includes tin, aluminum and their oxides, the steps which comprise immersing said container in an aqueous alkaline cleaning solution containing by weight about 3–8% chromate and about 4–20% silicate, and adding to said solution a mixture containing ferrocyanide ions and a strong alkaline oxidizing agent, said oxidizing agent having strength sufficient to oxidize the ferrocyanide ions to produce about 2–8% by weight ferricyanide.

3. In a method of removing incrustations from a work object having a surface selected from the group including tin, aluminum and their oxides, in which method the object is immersed in a hot, aqueous, strong alkali cleaning solution in the presence of a dissimilar surface selected from the group consisting of tin, aluminum and their oxides, which solution tends to attack the surface of said work object by galvanic corrosive action, the novel step which comprises inhibiting said corrosive action by incorporating about 2% to 8% by weight ferricyanide ions into said solution.

References Cited in the file of this patent

UNITED STATES PATENTS

| 1,799,930 | Seibert | Apr. 7, 1931 |
|---|---|---|
| 2,515,529 | Ryznar et al. | July 18, 1950 |

OTHER REFERENCES

Chemical Formulary—Bennett, vol. 6 (1943), pp. 492–493.